United States Patent [19]

Mantovani

[11] Patent Number: 6,070,312
[45] Date of Patent: Jun. 6, 2000

[54] MULTIPLE OPERATOR STATION FOR MACHINE TOOLS

[76] Inventor: Sascha Mantovani, Via Camara 46, 6932 Breganzona, Switzerland

[21] Appl. No.: 09/142,012
[22] PCT Filed: Dec. 30, 1996
[86] PCT No.: PCT/IB96/01474
§ 371 Date: Aug. 31, 1998
§ 102(e) Date: Aug. 31, 1998
[87] PCT Pub. No.: WO98/29216
PCT Pub. Date: Jul. 9, 1998

[51] Int. Cl.[7] .................. B23Q 5/04; B23C 1/10
[52] U.S. Cl. .................. 29/50; 29/26 A; 409/202; 409/212
[58] Field of Search .............. 29/26 A, 50, 53, 29/27 R, 27 C, 27 A, 40, 39, 38, 563, 55, 54; 483/30; 409/202, 212, 201, 204

[56] References Cited

U.S. PATENT DOCUMENTS

| 3,668,971 | 6/1972 | Dever | 409/202 |
|---|---|---|---|
| 4,730,373 | 3/1988 | Senoh | 29/26 A |
| 4,856,178 | 8/1989 | Salvagnini | 29/27 A |
| 4,858,301 | 8/1989 | Galarowic | 29/563 |
| 5,314,397 | 5/1994 | Mills et al. | 483/30 |
| 5,943,750 | 8/1999 | Koren et al. | 29/26 A |

FOREIGN PATENT DOCUMENTS

| 1158084 | 12/1983 | Canada | 409/202 |
|---|---|---|---|
| 58-56716 | 4/1983 | Japan | 409/202 |

*Primary Examiner*—William Briggs
*Attorney, Agent, or Firm*—Young & Thompson

[57] ABSTRACT

Multiple operator station (1) for machine tools designed in particular for chip removal along several axes, comprises several operator units (3,4,5) suitable for coupling with a tool or a workpiece, these operator units (3,4,5) being fitted on a bearing structure (2) that is curved in shape with the concave part facing downwards, and positioned in such a way that below the zone (6) in which the part is positioned during machining, there are no functional parts of the machine subject to movement of one part in relation to another.

5 Claims, 3 Drawing Sheets

6,070,312

MULTIPLE OPERATOR STATION FOR MACHINE TOOLS

FIELD OF THE INVENTION

This invention concerns the field of machine tools for removing material, and refers more particularly to a multiple operator station suitable for such machines and equipment in order to be able to handle milling, turning, drilling and grinding operations in the direction of predetermined axes, by means of a series of operator units.

BACKGROUND OF THE INVENTION

An operator station of this type is currently obtained by superimposing or mechanically linking several parts, of which each can move in the direction of one axis only of the orthogonal trio of Cartesian coordinates and/or perform rotary movements, all such traversing and rotation movements being necessary to impart the various advance, working and adjustment movements of the various tools and/or workpieces.

This of necessity means that each superimposed part forming the station has to be constructed in such a way as to afford sufficient rigidity and enable the required working precision, thus entailing massive, heavy structures.

In addition, as the parts that have to traverse in relation to each other along the required direction are interconnected by a sliding guide system, these guides must be very carefully constructed to ensure that the machining tolerances and play between the parts forming the guides of the various parts that are suprimposed or interconnected with each other to form the operator station, do not compromise the required degree of machining precision, when all the effects of their imprecisions and vibrations are combined.

A final disadvantage that cannot be overcome with operator stations as per the present state of the art lies in the fact that, when carrying out a grinding operation, the minute fragments of abrasive of the (grinding wheels*) used inevitably tend to fall onto the parts of the machine below, penetrating the sliding guides between the parts or between these and the base support, with the obvious results of serious damage to these parts. These stations thus cannot normally be used to handle grinding operations as well, unless there are expensive complex mechanical devices to prevent the action of minute grinding fragments as described above.

In summarizing the above disadvantages, it can be seen that multiple operator stations according to the present state of the art are more expensive and cumbersome, with relative difficulty in achieving working precision, and with the limitation of not normally being able to handle grinding work amongst other tasks.

SUMMARY OF THE INVENTION

The inventor of this invention has designed a multiple operator station that is light and simple to construct, in which the various component parts are positioned and coordinated in such a way as to substantially reduce the disadvantages and limitations described above.

To this effect, in fact, the inventor has designed the subject of this invention, which consists of a multiple operator station for machine tools with chip removal for turning, milling and grinding operations along several axes, characterized by the fact that it consists of several independent operator units suitable for connection equally to either a tool or workpiece, and to impart a machining and/or advance movement to each respectively, these units being fitted on a bearing structure that is curved in shape, with the concave part facing downwards, and positioned in such a way that, below the zone in which the part is positioned during any machining phase, there are no functional parts of the machine subject to movement in relation to each other.

A more detailed description is now given of a preferred form of construction of the operator station as per the invention in which all of the achievable advantages can be seen.

BRIEF DESCRIPTION OF THE DRAWINGS

In the description, reference is also made to the attached drawings, which represent the following.

DETAILED DESCRIPTION OF THE INVENTION

Figure 1:
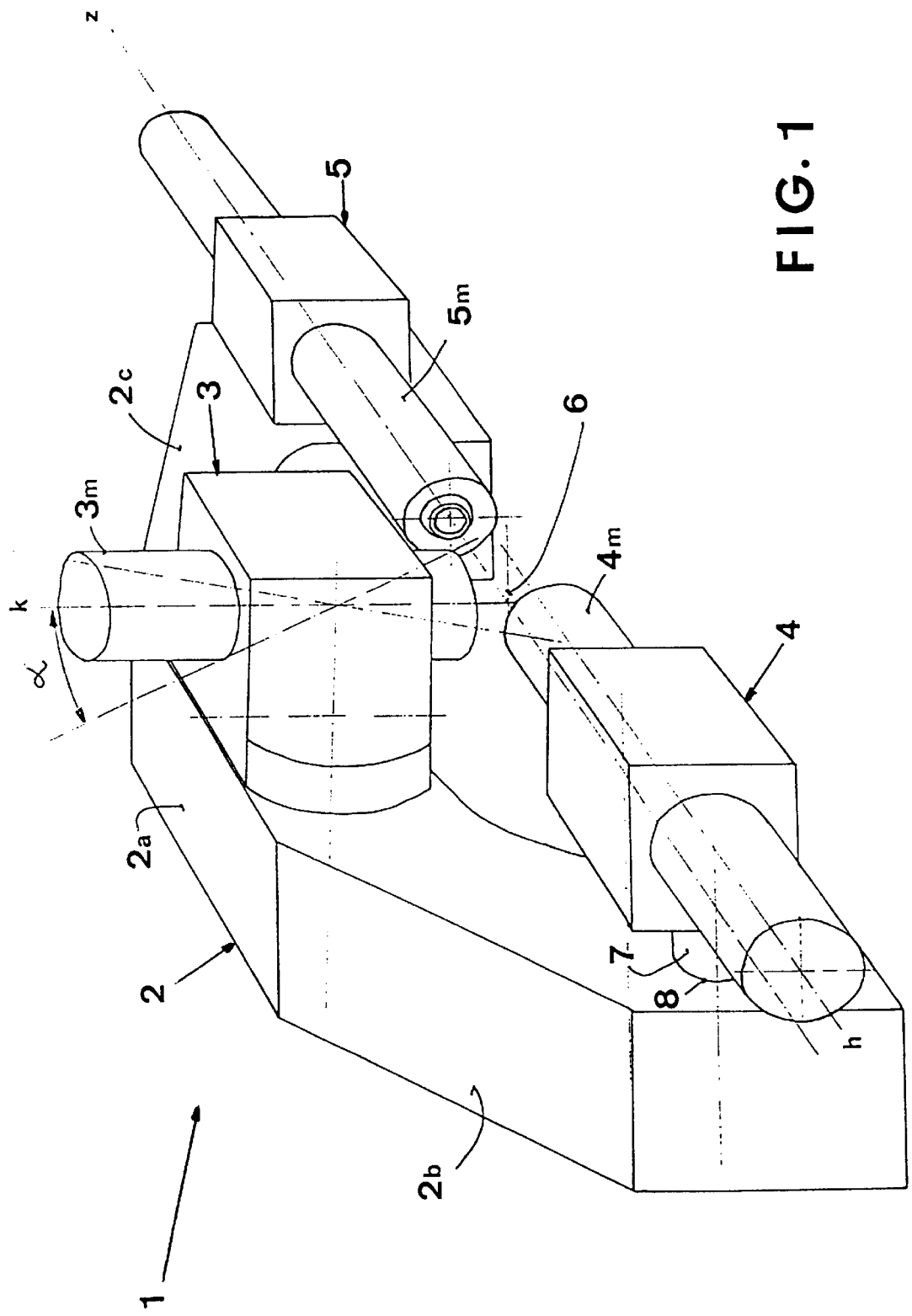
FIG. 1 is a perspective view of the preferred form of construction of a multiple station as per the invention.

Looking at FIG. 1, it can be seen how the multiple operator station as per this invention is formed: on a bearing structure 2 that is curved in shape with the concave part facing downwards, which, in the preferred form of construction shown has a "C" profile, a series of separate operator units 3, 4, 5, are fitted, with three shown in this case. These operator units are all equipped With a spindle 3m, 4m, 5m, designed for coupling with any tool with a handle of appropriate profile, for example conical, of known type, or with a tool-holder likewise provided with a profiled coupling handle in a similar way. One, 3, of these units is fixed to the central part of the horizontal side 2a of the "C" section, and has vertical axis K, whilst the other two, 4, 5, which have horizontal axes h, z, are fixed in a position facing its other two sides 2b, 2c, respectively.

These operator units are thus positioned such that, at any point during machining, and irrespective of which units are acting as a tool-holder and which as a workpiece-holder, below the zone 6 in which the workpiece is located, there are no functional parts of the machine subject to relative movement in relation to each other. This arrangement enables, as already stated, even grinding operations to be handled without the problem of grinding wheel fragments, which at worst fall onto a smooth surface formed by the base support of the multiple station 1 (not shown), and which can in fact be periodically removed by known methods without any problem.

The operational capabilities of each unit, 3, 4, 5, may vary according to the requirements of the proposed work cycle.

According to one indicative example proposed by the inventor, each of the spindles 3m, 4m, 5m, of the operator units 3, 4, 5 may be moved in a rotary action at a preset speed, in order to be able to carry out operations such as drilling and boring with the spindles holding the tools, or turning operations with the spindle holding the workpiece.

The operator unit with vertical axis k is adjustable vertically and its axis k can also be rotated to a preset angle α in the vertical plane containing it, running parallel to the "C" profile structure 2.

Figure 2:
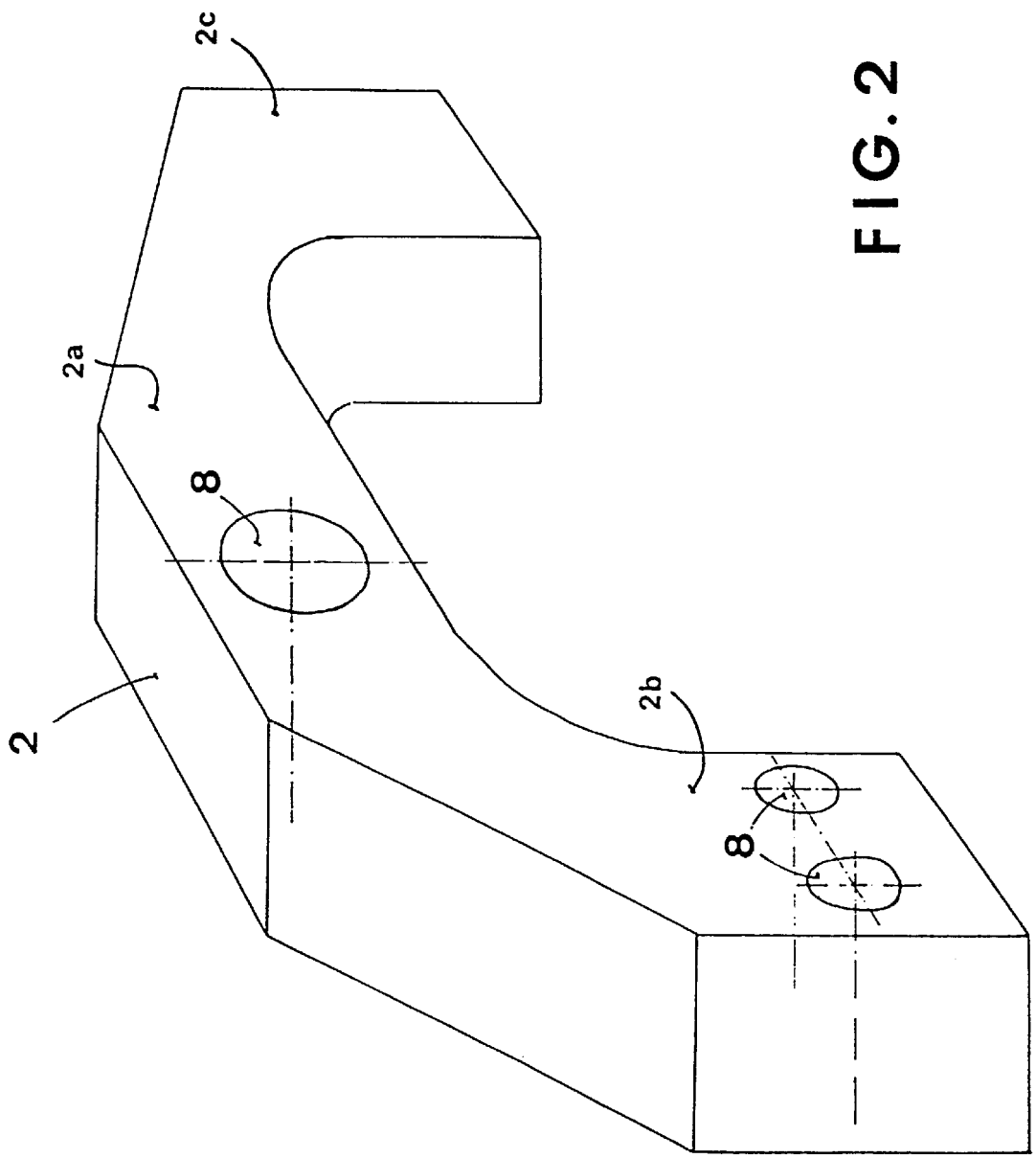
FIG. 2 is a perspective view of the bearing structure only at "C" on the station in FIG. 1.

Each of the two operator units 4, 5 positioned on the vertical sides 2b, 2c of the "C" profile structure 2, or the relative spindle, is also adjustable in an axial direction, i.e. parallel to the structure, and laterally, ie.. perpendicular to this. This latter movement can be achieved for example by sliding the operator unit in relation to guide journals 7, which slide axially within holes 8 (FIGS. 1 and 2) provided in the bearing structure 2.

The spindles 3m, 4m, 5m of the operator units 3, 4, 5 can also be rotated by preset angles within the respective axes k, h and z, and then maintained in this position for example throughout a machining phase in which the spindles 3m, 4m, 5m fulfil the function of workpiece-holders.

It will be evident to an engineer in this sector how this latter adjustment capability is much easier and much more efficient, for example, than using a distributor of known type.

With a multiple station as described above, it is possible to handle even highly complex and delicate machining cycles quickly and with minimum relative displacement between the various parts, whilst still obtaining optimum results in terms of precision with a much simpler, lighter and more versatile station than the conventional type.

The bearing structure 2 can be arranged in various ways, as well as vertically as in the case shown.

Depending on the type of machining, this may also be constructed of different types of material, for example with granite as well when a particular dimensional stability is required, guaranteed by the type of material and its low thermal expansion.

Figure 3:
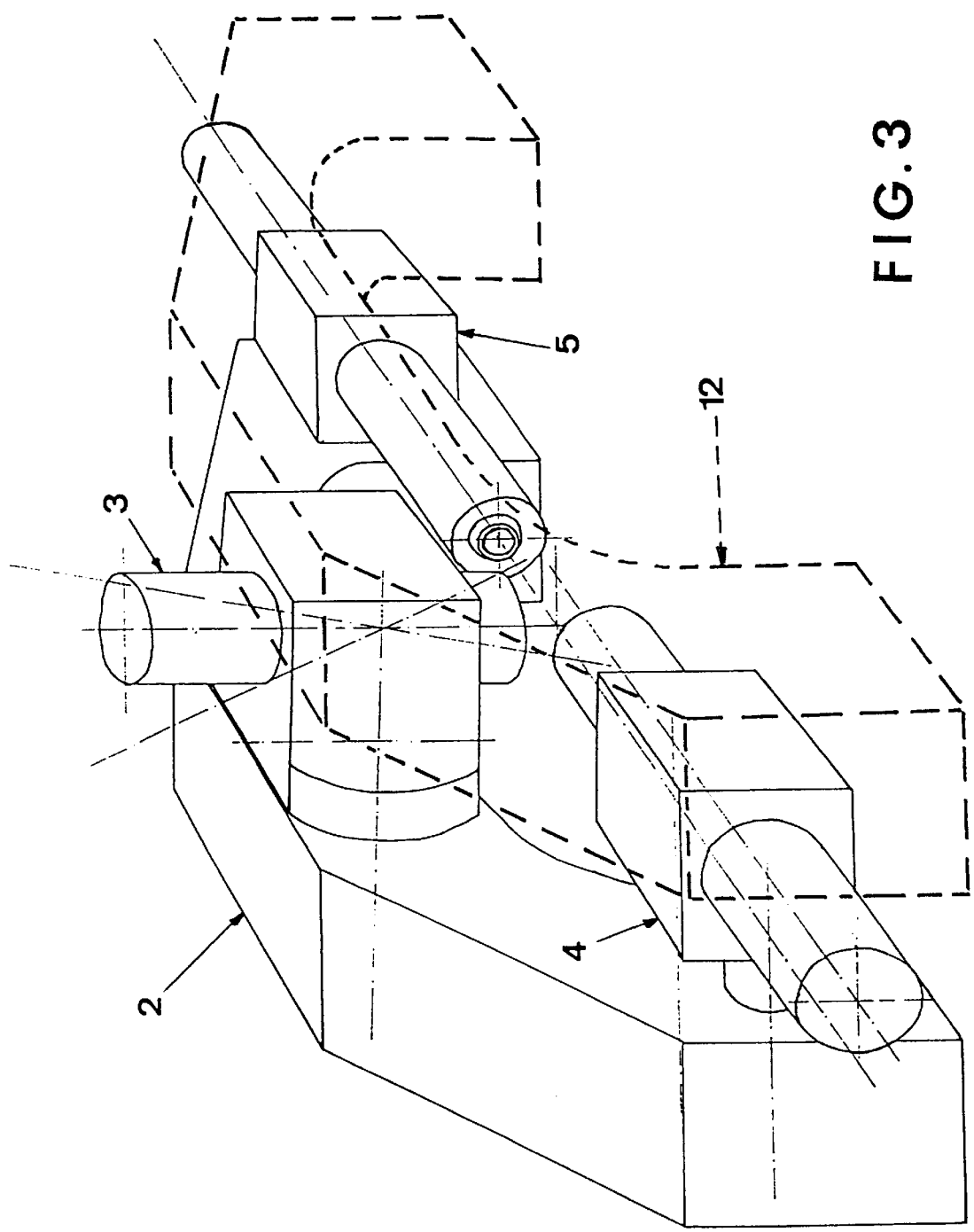
FIG. 3 is a perspective view of another form of construction of the invention in which the operator units are interposed between two parallel C-profile bearing structures to provide greater rigidity.

To enhance the rigidity still further, a multiple operator station as per the invention may also comprise a second bearing structure 12 that is curved in shape and arranged parallel to the first bearing structure 2, with the different units interposed so that they slide between the two structures 2 and 12, as also shown by a broken line in FIG. 3.

Several multiple stations can finally be arranged parallel to and aligned with each other so that the concave sections form a tunnel through which the parts can be fed from station to station in the case of automated machining cycles.

Other construction solutions are finally available to an engineer in the sector to achieve the optimum solution in each case for given machining cycles. These constructions, albeit different from those described and shown thus far, still fall within the scope of protection granted by the attached claims where based on the concepts established herein.

It is pointed out that the multiple operator station as per the invention is suitable for carrying out machining cycles with chip removal on parts made of any material such as metals, synthetic resins, wood, ceramics, composites, etc.

Also, by using appropriate tools, the station can also handle tasks other than chip removal, such as coupling parts, measurement and dimensional checks.

What is claimed is:

1. A multiple operator station for machine tools with chip removal from a workpiece by at least one of turning, milling and grinding operations along several axes, the operator station comprising:

a bearing structure having a first vertical side and a second vertical side joined together by an intermediate third side; said first, second and third sides extending in respective planes which are one of parallel and coplanar; said first, second and third sides being structured and arranged to form a concave open portion facing downwardly away from said third side;

a first guide journal attached to said first side and extending in the direction of a first axis; a second guide journal attached to said second side and extending in the direction of a second axis; and a third guide journal attached to said third side and extending in the direction of a third axis; said first, second and third axis being perpendicular to said first, second and third side, respectively; said first and second guide journal being movable relative to said first and second surface, respectively, in a direction perpendicular to said first and second sides, respectively; said third guide journal being rotatable relative to said third axis;

a first operator unit comprising a first spindle extending in a first direction of a first spindle axis, said first operator unit being attached to said first guide journal; a second operator unit comprising a second spindle extending in a second direction of a second spindle axis, said second operator unit being attached to said second guide journal; and a third operator unit comprising a third spindle extending in a third direction, said third operator unit being attached to said third guide journal; said first, second and third spindle being rotatable relative to and movable in the direction of, said first, second and third spindle axis, respectively; said first, second and third spindle being structured and arranged for coupling one of a tool and a workpiece holder to a respective first, second and third spindle end; and said first, second and third spindle end being spaced from each other to provide a work zone adjacent said concave open portion.

2. The multiple operator station according to claim 1, wherein the bearing structure is curved in shape and has a C-profile.

3. The multiple operator station according to claim 2, wherein each of the first, second and third spindle is structured and arranged to rotate at a preset speed.

4. The multiple operator station according to claim 1, wherein each of the first, second and third spindle is structured and arranged to rotate at preset angles.

5. A machine tool comprising a plurality of multiple operator stations according to claim 1, positioned parallel to and aligned with each other such that the concave open portion of each bearing structure together form a tunnel.

* * * * *